Dec. 17, 1957    T. P. DUSENBURY ET AL    2,816,755
METHOD AND APPARATUS FOR MAKING SHINGLED STRIPS
Filed Oct. 5, 1951    7 Sheets-Sheet 3
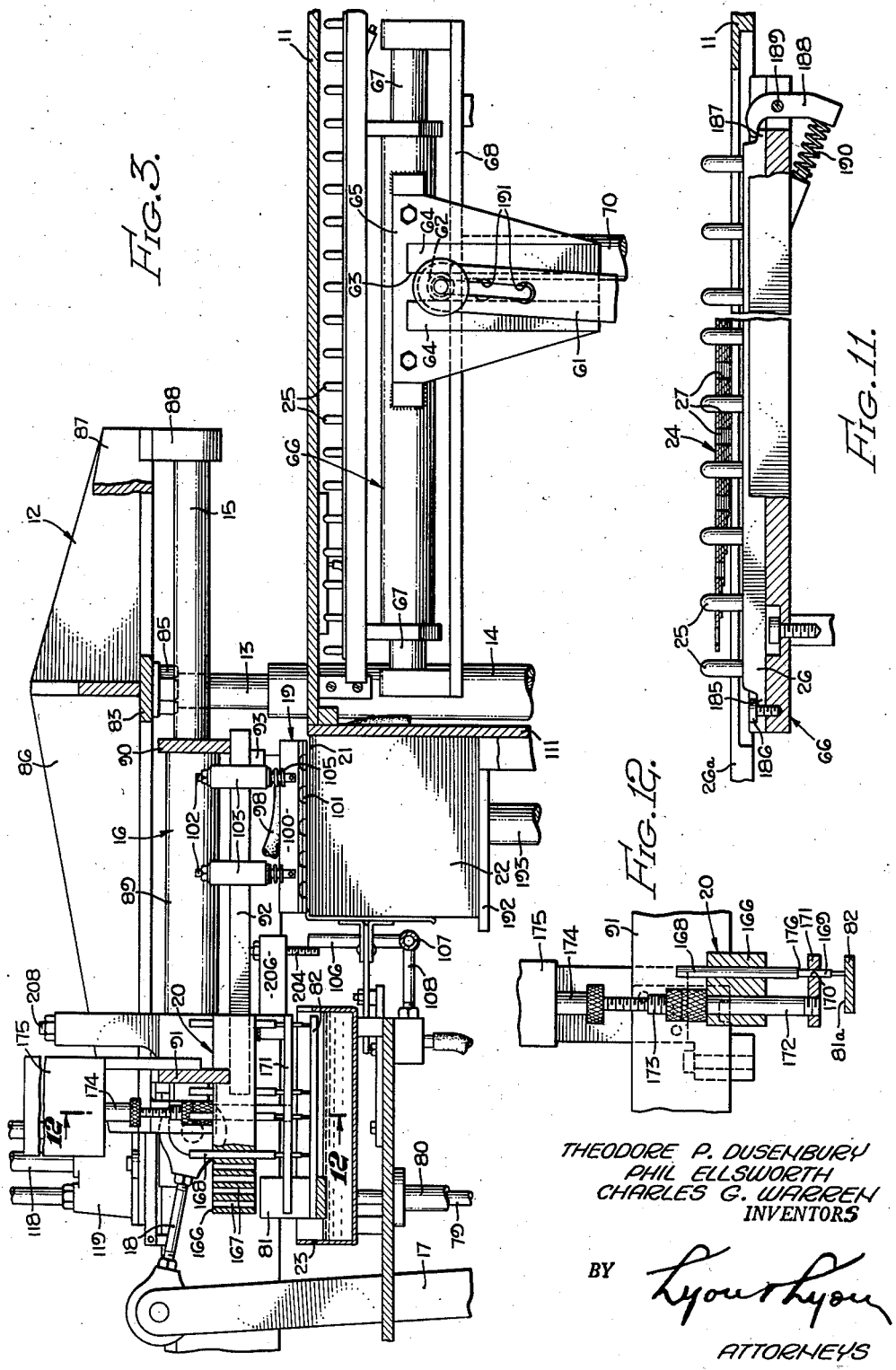
THEODORE P. DUSENBURY
PHIL ELLSWORTH
CHARLES G. WARREN
INVENTORS
BY Lyon+Lyon
ATTORNEYS

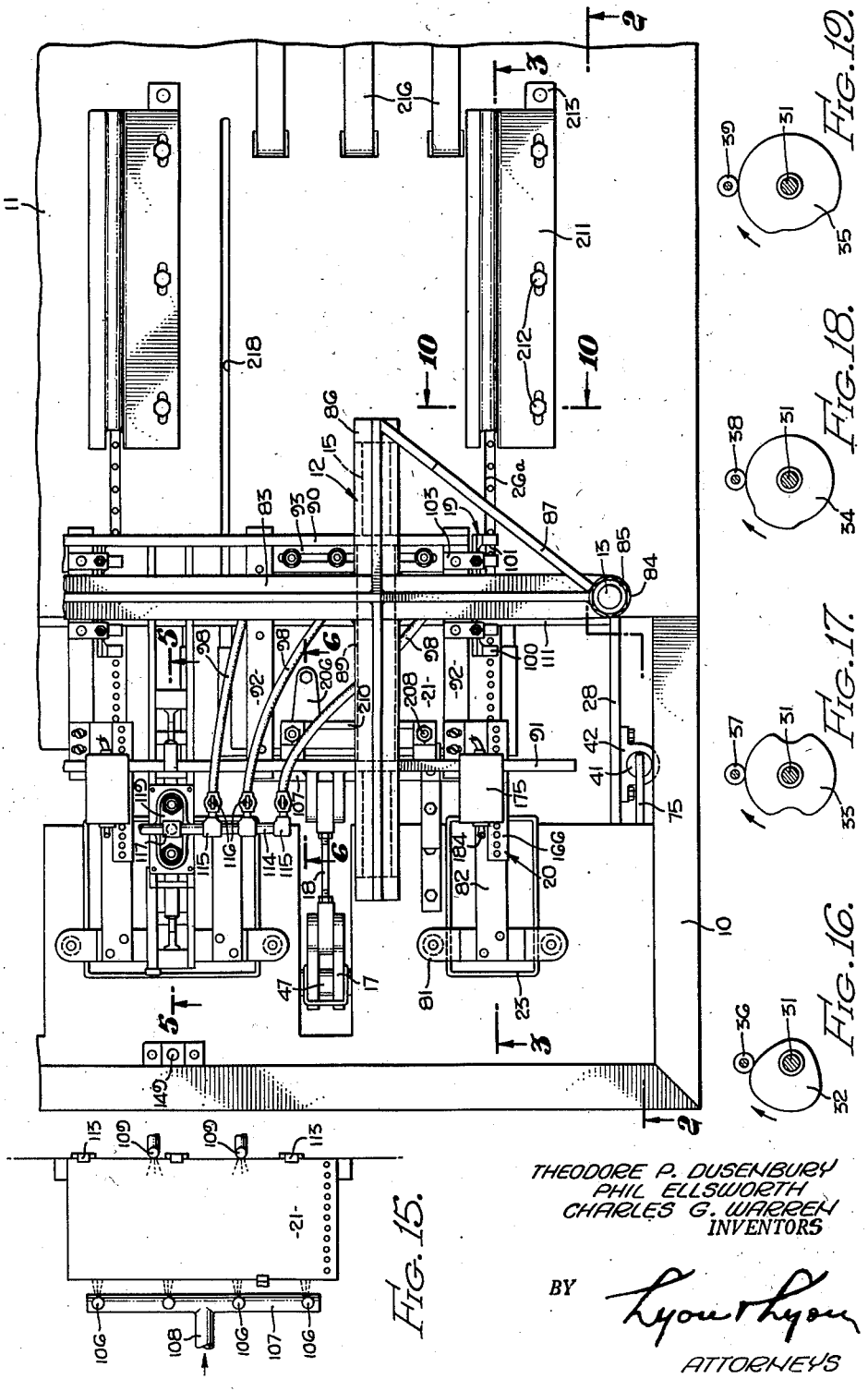

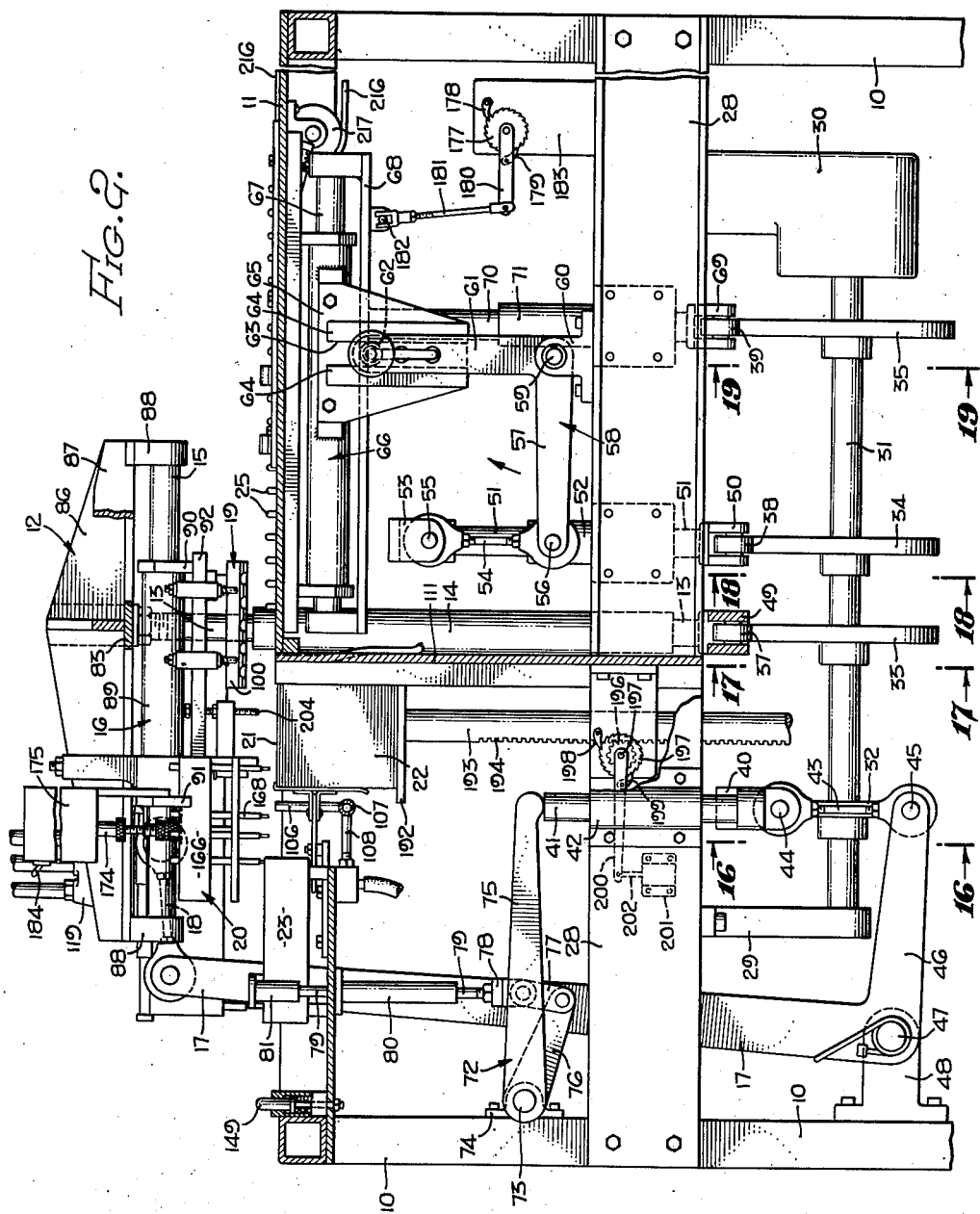

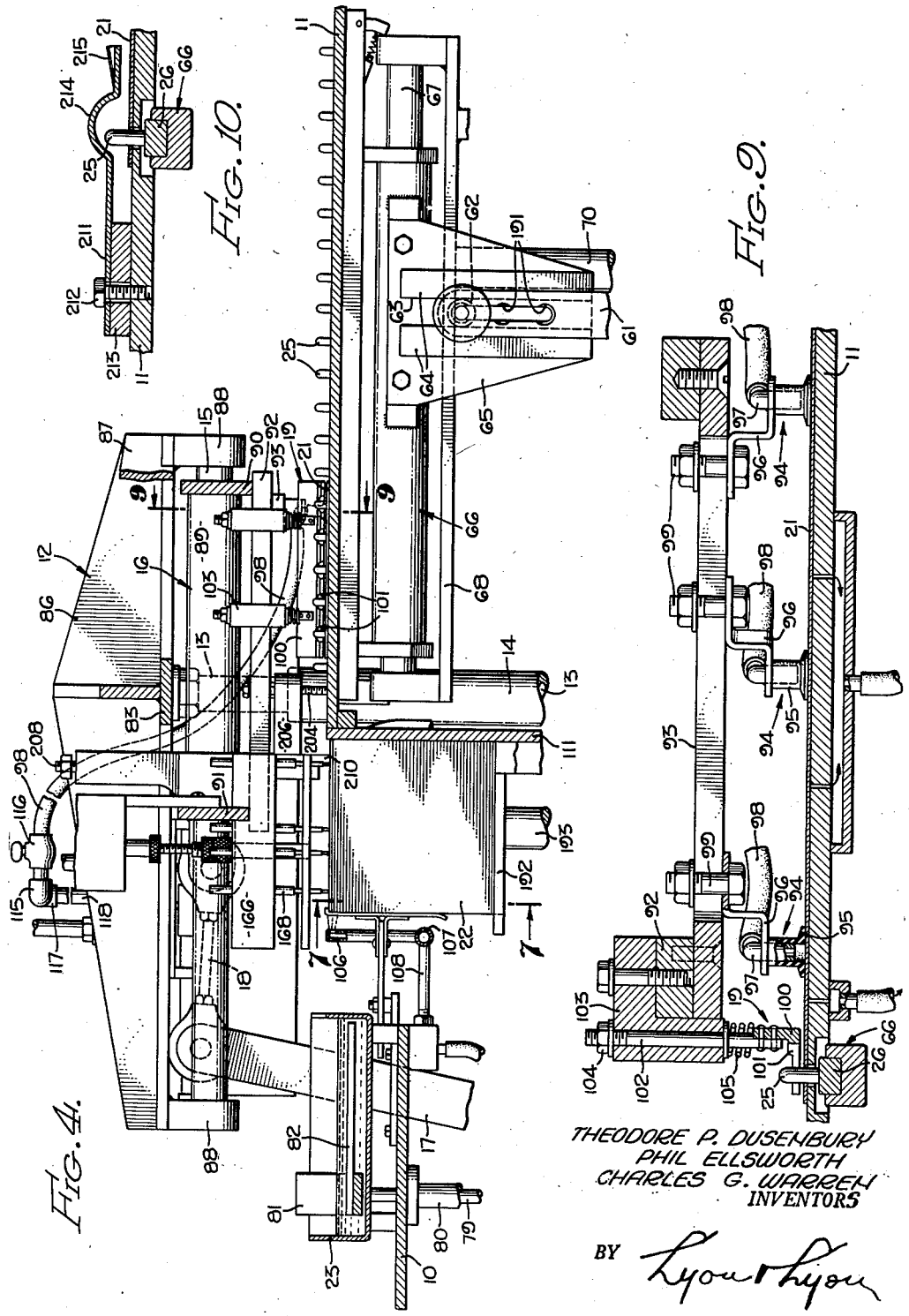

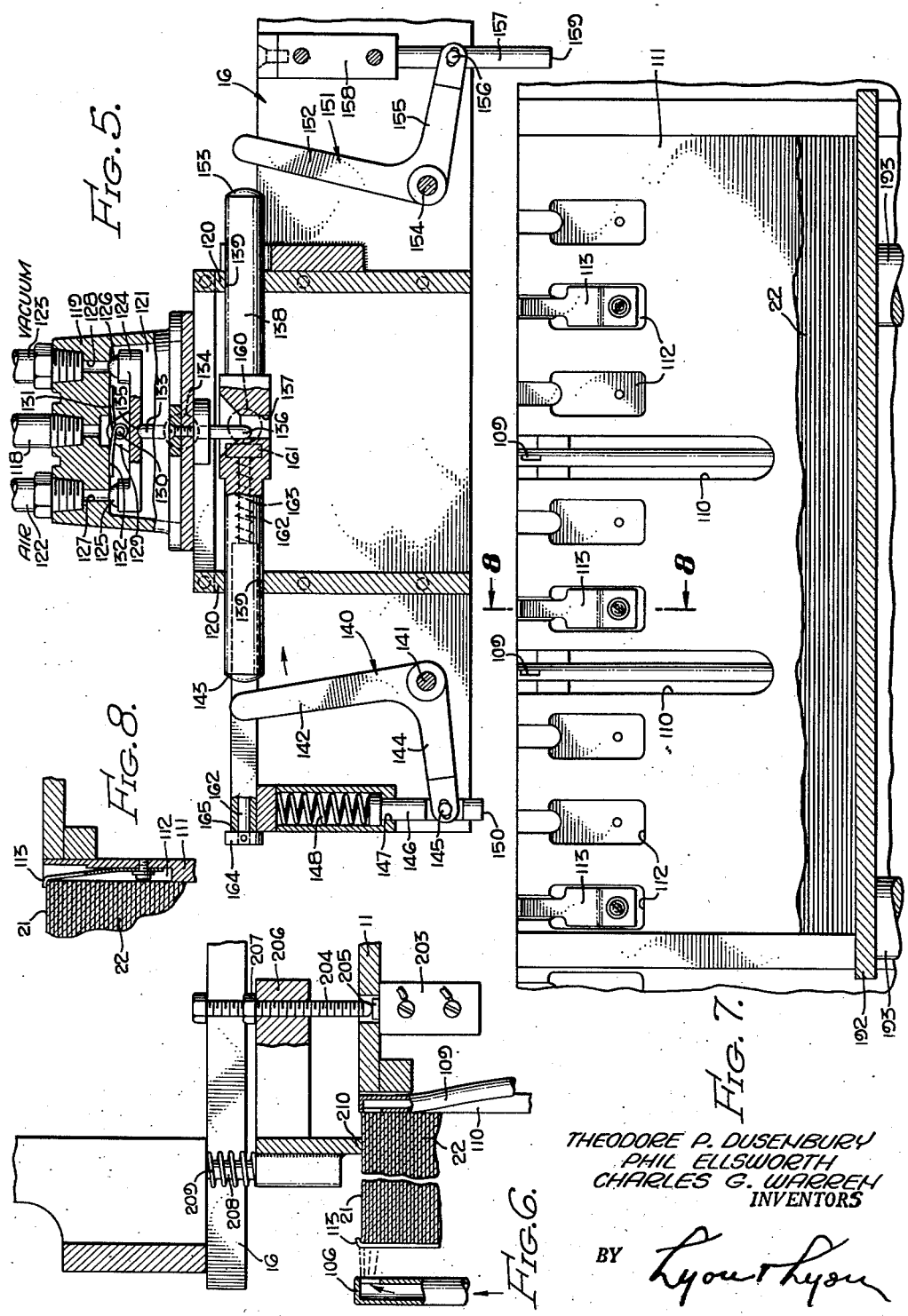

Dec. 17, 1957  T. P. DUSENBURY ET AL  2,816,755
METHOD AND APPARATUS FOR MAKING SHINGLED STRIPS
Filed Oct. 5, 1951  7 Sheets-Sheet 6

THEODORE P. DUSENBURY
PHIL ELLSWORTH
CHARLES G. WARREN
INVENTORS

BY Lyon & Lyon
ATTORNEYS

Dec. 17, 1957     T. P. DUSENBURY ET AL     2,816,755
METHOD AND APPARATUS FOR MAKING SHINGLED STRIPS
Filed Oct. 5, 1951     7 Sheets-Sheet 7
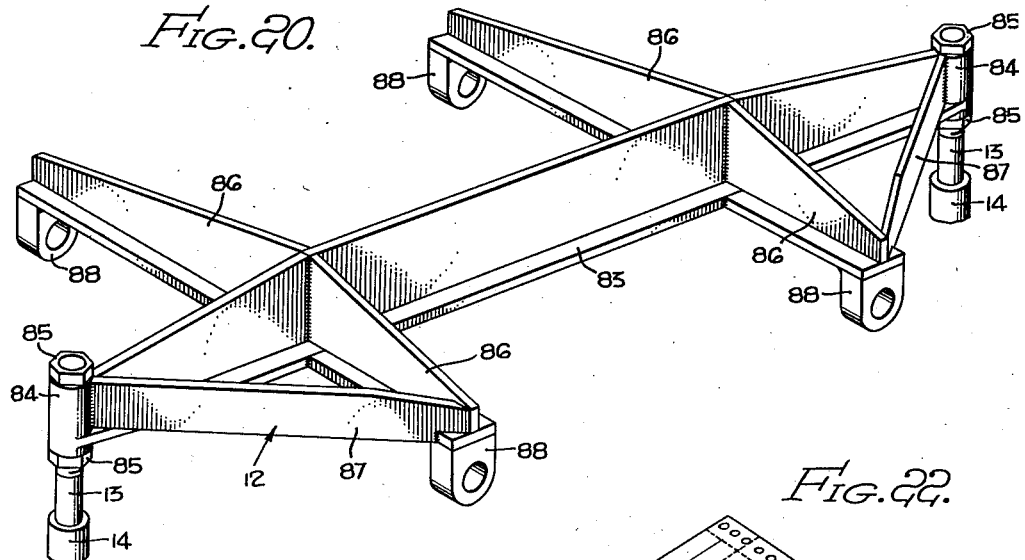
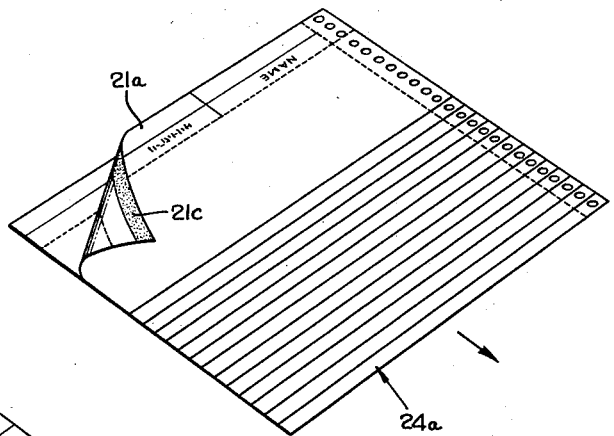
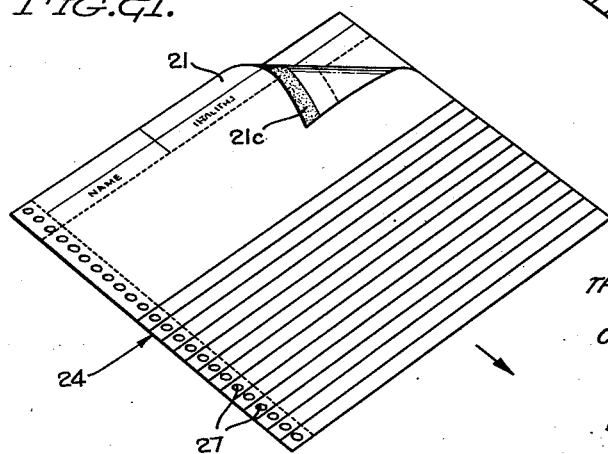
THEODORE P. DUSENBURY
PHIL ELLSWORTH
CHARLES G. WARREN
INVENTORS
BY *Lyon & Lyon*
ATTORNEYS

United States Patent Office 2,816,755
Patented Dec. 17, 1957

2,816,755

METHOD AND APPARATUS FOR MAKING SHINGLED STRIPS

Theodore P. Dusenbury and Phil Ellsworth, Los Angeles, and Charles G. Warren, South Gate, Calif., assignors, by mesne assignments, to Burroughs Corporation, Detroit, Mich., a corporation of Michigan Application October 5, 1951, Serial No. 249,884

21 Claims. (Cl. 270—58)

This invention relates to sheet handling and stacking apparatus and is particularly directed to improvements in method and apparatus for making shingled strips. Shingled strips of the type contemplated herein comprise a group of duplicate sheets stacked in staggered, or shingled, relationship so that the side edges of the individual sheets are in registry and the top and bottom edges are spaced with respect to adjacent sheets.

In the improved method and apparatus embodying our invention, individual sheets are moved laterally from a pile to a position of alignment with a row of vertical pins. Each sheet has a series of holes along at least one edge to receive the pins. A laterally movable transfer member is provided with suction cups which pick up the top sheet in the pile. The transfer member also carries glue-applying fingers. When the transfer member moves down to place the sheet on the pins the glue fingers on the transfer member deposit spots of glue on the top sheet in the pile. The transfer member moves back to pick up the next sheet and transports it to the row of pins. Meanwhile the row is moved horizontally one notch so that the second sheet is placed on the pins but in staggered relation with respect to the first sheet. The operation continues with the transfer member moving back and forth between the pile of sheets and the row of pins while the latter moves intermittently in one direction. The length of the strip of overlapping sheets increases as the transfer member continues to pick up the top sheet in the pile and transfer it to the row of pins. When the number of sheets in the strip reaches a predetermined quantity the gluing operation is interrupted for one cycle. The shingled strip is then completed. Sheets deposited thereafter on the pins become part of a separate shingled strip.

The general objects of the present invention are to provide a method of forming shingled strips from a pile of sheets as described above and also to provide a novel form of apparatus for carrying out this method.

Other related and more detailed objects and advantages will appear hereinafter.

In the drawings:

Figure 1 is a top plan view partly broken away showing a preferred embodiment of our invention.

Figure 2 is a side elevation partly broken away and partly in section along the line 2—2 as shown in Figure 1.

Figure 3 is a sectional elevation taken substantially on the line 3—3 as shown in Figure 1 showing the transfer member in its rearward position.

Figure 4 is a view similar to Figure 3 showing the transfer member in its forward postion.

Figure 5 is a sectional elevation taken substantially on the line 5—5 as shown in Figure 1.

Figure 6 is a sectional detail taken substantially on the line 6—6 as shown in Figure 1.

Figure 7 is a sectional elevation taken substantially on the line 7—7 as shown in Figure 4.

Figure 8 is a fragmentary detail taken on the line 8—8 as shown in Figure 7.

Figure 9 is a transverse sectional view partly broken away and taken substantially on the line 9—9 as shown in Figure 4.

Figure 10 is a transverse sectional elevation taken substantially on the line 10—10 as shown in Figure 1.

Figure 11 is a sectional view showing a portion of Figure 3 on an enlarged scale.

Figure 12 is a sectional detail taken substantially on the line 12—12 as shown in Figure 3.

Figure 15 is a diagrammatic plan view showing the air jet nozzle arrangement for separating the uppermost sheets in the pile.

Figures 13, 14:
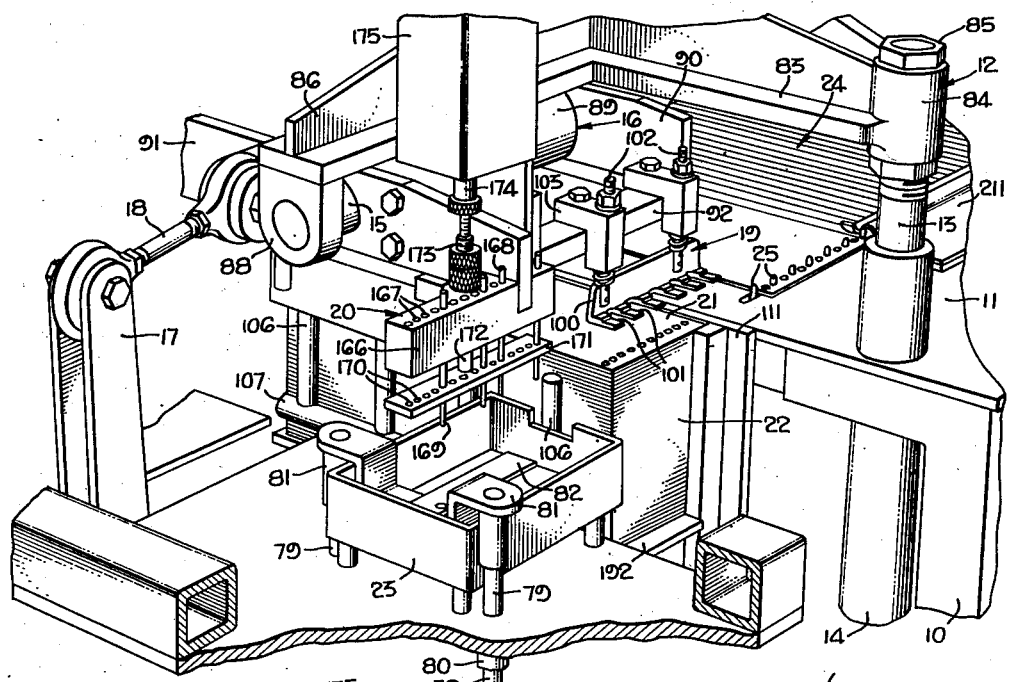
Figure 13 is a perspective view partly in section and partly broken away showing details of the transfer member, carrier, glue-applying mechanism, and table.
Figure 14 is a perspective view partly broken away and partly in section showing the apparatus of Figure 13 from another angle.

Figures 16, 17, 18 and 19 are sectional elevations taken substantially on the lines 16—16, 17—17, 18—18, and 19—19, respectively, as shown in Figure 2.

Figure 20 is a perspective view of the cross-head.

Figure 21 is a perspective view of a shingled strip having a row of holes along its left-hand edge.

Figure 22 is a similar view of a shingled strip having a row of holes along its right-hand edge.

Referring to the drawings, the supporting frame 10 includes a table 11 defining a working surface. A cross-head 12 is supported on a pair of vertical posts 13 which are guided in sleeves 14 fixed on the frame 10. The cross-head 12 is provided with horizontal parallel slide bars 15. A transfer member generally designated 16 is mounted for sliding movement along the parallel bars 15. The transfer member 16 is reciprocated along the bars 15 by means of the lever 17 acting through link 18. The transfer member 16 is provided with a sheet-gripping device 19 and a glue-depositing mechanism 20.

In the general scheme of operation the sheet-gripping device 19 picks up the top sheet 21 in the pile 22. At the same time the glue-depositing device 20 picks up glue contained in the basin 23. Forward movement of the transfer member 16 and accompanying vertical movement of the cross-head 12 brings the sheet 21 into position on the table 11 in staggered relation with respect to other sheets previously deposited and which make up the shingled strip 24. A row of pins 25 carried on a peg rail 26 receive apertures 27 provided in the individual sheets 21 and thus serve to align and positively space the individual sheets in the shingled strip 24. The row of pins moves forward for a predetermined distance each time the transfer member 16 returns to pick up another sheet and the shingled strip 24 is thus carried forward on the table 11 for a distance corresponding to the amount of overlap between the individual sheets 21. Before the next sheet is deposited the pins are retracted downward out of the sheet openings 27 and then moved rearwardly and then upwardly to their initial position in time to receive the apertures on the next sheet deposited. Each time the sheet-gripping device 19 places a new sheet on the shingled strip 24 the glue-depositing mechanism 20 places a row of spots of glue or other adhesive on the top sheet in the pile 22. Accordingly, each time an individual sheet 21 is added to the shingled strip 24 it is contacted by the glue spots on the top surface of the previously deposited sheet and the sheets in the strip are thus secured together.

Proceeding to a more detailed description of the various parts of the machine, the frame 10 is provided with a cross-member 28 (see Figure 2), which serves as a structural support for the bearing hanger 29 and the driving head 30. A cam shaft 31 is supported in bearings (not shown) contained within the driving head 30 and hanger 29, and power means of any suitable type (not shown) are provided within the driving head 30 for turning the shaft 31. Cams 32, 33, 34 and 35 are each fixed on the cam shaft 31. Follower rollers 36, 37, 38 and 39 are provided for each of the cams, respectively. Follower roller 36 is rotatably mounted on a bracket 40 which is secured to the lower end of the plunger 41. The plunger 41 is slidably mounted in a guide bearing 42 fixed to the support member 28. A link 43 is pivotally connected at 44 to the bracket 40 and is pivotally connected at 45 to the actuating arm 46 of the crank 17. The crank 17 is pivotally connected at 47 to the bracket 48 carried on the frame 10. Rotation of cam 32 causes reciprocation of plunger 41 and thereby oscillates the crank 17 through the link 43 and arm 46.

Cam follower 37 is mounted on a transverse horizontal member 49 which is connected to the lower ends of the parallel sliding posts 13. Turning movement of the cam 33 serves to raise and lower the cross-head 12 fixed on the upper ends of the parallel sliding posts 13.

Cam follower 38 is fixed on a clevis 50 carried on the lower end of the vertical rod 51 which leads within the guide bushing 52 fixed on the support member 28. A bracket 53 is fixed at the upper end of the post 51. A link 54 is pivotally connected at 55 to the bracket and is pivotally connected at 56 to one arm 57 of a bell crank 58. The bell crank 58 is connected by pivot pin 59 to the stationary bracket 60 fixed on the support member 28. The other arm 61 of the bell crank 58 carries a roller 62 at its outer end which is received within a track 63 defined between parallel rails 64 on the bracket 65. The bracket 65 is fixed to the sliding carrier 66 for the peg rails 26. The carrier 66 slides on the parallel horizontal bars 67 provided on the support 68. From this description it will be understood that rotation of the cam 34 causes the rod 51 and link 54 to oscillate the bell crank 58 and thereby reciprocate the carrier 66 horizontally on the parallel bars 67.

The follower roller 39 is mounted on a transverse cross-member 69 which is fixed to the lower ends of the parallel vertical bars 70. These bars are guided for movement within stationary guide sleeves 71 fixed on the support member 28. The upper ends of the bars 70 are fixed to the support 68. Rotation of the cam 35 therefore serves to reciprocate the support 68 by means of the parallel bars 70.

The bell crank 72 is connected by pin 73 to bracket 74 fixed on the frame 10. A long arm 75 of this bell crank rests on the upper end of the plunger 41 and a short arm 76 of the bell crank is pivotally connected by means of link 77 and clevis 78 to the lower ends of the parallel push rods 79. A guide sleeve 80 fixed to the frame 10 is provided for guiding each of the rods 79. A bracket 81 fixed to the upper end of the push rods 79 carries a plate 82 which is located within the glue basin 23. This plate 82 is moved above and below the level of the liquid glue or other adhesive contained within the basin 23. This lifting and lowering movement is accomplished by means of the rods 79, bell crank 72 and plunger 41. Lifting of the plate 82 is timed to occur when the transfer member 16 moves rearwardly along the bars 15. Lowering of the cross-head 12 then causes the glue-depositing mechanism 20 to engage the glue covered surface of the elevated plate 82.

The cross-head 12 comprises a transverse beam 83 provided with bosses 84 at its ends to receive the upper ends of the parallel posts 13. The upper ends of these posts may be reduced in diameter and threaded. Nuts 85 mounted on the threaded portion are used to fix the bosses 85 with respect to the posts 13. Parallel longitudinally extending beams 86 are also provided on the cross-head 12, and these beams intersect the main beam 83. Angle braces 87 may be provided if desired to increase rigidity of the cross-head structure. Lugs 88 are provided on opposite ends of the longitudinal beams 86, and these lugs support the parallel horizontal slide bars 15.

The carrier generally designated 16 includes a pair of parallel tubes 89 which slide on the parallel bars 15. Cross-members 90 and 91 are fixed to the ends of the tubes 89 and the extending ends of these cross-members are connected by parallel longitudinal bars 92. The sheet-gripping device generally designated 19 is mounted on the parallel longitudinal bars 92. As best shown in Figures 9 and 14 this device 19 includes a bracket 93 carried on the bars 92 and forming a support for the suction cup elements 94. These suction cup elements are of the general type employed in sheet feeding devices commonly employed in connection with printing presses and their particular construction forms no part of our present invention. Each of these elements 94 includes a hollow resilient suction cup 95 carried on a bracket 96 and connected by way of a fitting 97 to a flexible hose 98. Each bracket 96 may be adjustably supported on the larger bracket 93 by means of screw fastenings 99. A presser foot assembly 100 having a plurality of slots 101 is carried on a pair of plungers 102 mounted for sliding movement within L-shaped lugs 103. A nut 104 threaded to the upper end of each plunger limits the downward movement thereof under action of the coil spring 105 which encircles each plunger and bears against the presser foot 100. The spacing of the slots 101 in the presser foot is the same as the spacing of the pins 25. The purpose of the presser foot 100 is to press each individual sheet 21 down to the level of the table 11 and to insure that the apertures 27 in the individual sheets 21 are pressed down fully over the upstanding pins 25.

When the transfer member 16 is moved to its rear position as shown in Figures 3 and 13 the suction cup elements 94 are brought into contact with the top surface of the uppermost sheet 21. Suction pressure is applied to the hoses 98, thereby causing the suction cups 95 to become attached to the uppermost sheet 21. When the transfer member 16 moves forward to the position shown in Figure 4 carrying the sheet-gripping device 19 with it, the sheet 21 is placed on the table 11 with the upstanding pins 25 extending through the apertures 27 in the sheet. The presser foot 100 insures that the upstanding pins 25 shall fully enter the sheet apertures 27. At this point positive pressure is applied through the hoses 98 to release the grip of the suction cups 95 on the surface of the sheet 21. Air nozzles 106 may be employed to separate the top sheet 21 from the stack or pile 22. These air nozzles may be mounted on a header pipe 107 (Figure 15) and fed from a common supply pipe 108. Other air nozzles 109 may be mounted on the other side of the pile from the header pipe 107 and arranged to direct an air jet to separate the uppermost sheets in the pile. Clearance for the pipes leading to the nozzles 109 may be provided by the slots 110 formed in the vertical wall 111 which constitutes a part of the frame 10. A series of recesses 112 may also be formed in this wall 111 if desired for the purpose of receiving spring clips 113 which engage the upper sheet in the pile 21 at spaced points. The nozzles 109 may be supplied from the same source of air pressure as the nozzles 106.

Means are provided for alternately subjecting the hoses 98 to positive air pressure, and to suction or vacuum pressure. As shown in the drawings, this means includes a header pipe 114 connetced to each of the hoses 98 by way of a fitting 115 and a shut-off cock 116. A T-fitting 117 connects the header 114 with the nipple 118 which is in turn connected to the valve housing 119 (see Figure 5). The valve housing 119 is supported on parallel plates 120 mounted on the transfer member 16. The nipple 118 communicates with the chamber space 121 within the valve housing. An air supply line 122 and a vacuum pressure supply line 123 also communicate with this chamber 121. A rocker valve member 124 is provided for connecting either of the lines 122 or 123 to the chamber 121 as required. The rocker valve member 124 is provided with spaced sealing elements 125 and 126 which are adapted to seat against the inlet ports 127 and 128 respectively. The nipple 118 remains in communication with the chamber 121 at all times.

The rocker valve member 124 is provided with a pair of laterally spaced centrally positioned ears 129, and a pivot bar 130 extends between these ears. A spring 131 encircles the pivot bar 130 and bears against the top wall 132 of the chamber 121. A downward force is thus applied to the pivot bar 130 by the spring 131. A support finger 133 is pivotally mounted by means of trunnions 134, and the upper end of this finger 133 rests in a shallow groove or notch 135. A trigger 136 is formed integrally with the support finger 133 and trunnions 134 and extends downwardly out of the enclosure 121. The trigger is received within an aperture 137 which extends transversely through the shifter bar 138. This bar 138 is slidably mounted within aligned apertures 139 provided on the parallel plates 120. When the bar 138 is shifted to the right as viewed in Figure 5, the support finger 133 moves to the left out of the notch 135 and the spring 131 thereupon moves the pivot bar 130 and rocker valve assembly 124 in a direction to move the seal element 126 downward away from the port 128, thereby admitting vacuum pressure to the chamber 121 from the line 123. When the shifter bar 138 is moved toward the left as viewed in Figure 5, the support finger 133 moves to the right out of the notch 135 and the spring 131 moves the rocker valve assembly 124 in a direction to move the seal 125 downward away from the port 127, thereby admitting air pressure into the chamber 121.

A bell crank 140 is pivoted at 141 to the transfer member 16. One arm 142 is adapted to contact the end 143 of the shifter bar 138. The other arm 144 is slidably connected for actuation by pin 145 mounted on plunger 146. The plunger 146 is guided for vertical sliding movement within bore 147, and a spring 148 is provided for moving the plunger downwardly. A bumper 149 is mounted on the frame 10 in a position to be contacted by the lower end 150 of the plunger 146 when the transfer member 16 is lowered to pick up a sheet from the pile 22. From the above description it will be understood that the shifter bar 138 is moved to the right as viewed in Figure 5 whenever the transfer member 16 is moved to its rearmost position and lowered to pick up a sheet from the pile 22.

A bell crank 151 has an arm 152 arranged to engage the forward end 153 of the shifter bar 138. This bell crank 151 is pivotally mounted at 154 on the transfer member 16. The arm 155 is slidably connected to pin 156 carried on the plunger 157. The mounting of the plunger 157 for vertical sliding movement is substantially the same as that shown in connection with plunger 146, and this mounting includes a spring (not shown) for moving the plunger 157 downward relative to the spring housing 158. The lower end 159 of the plunger 157 engages the surface of the table 11 when the transfer member 16 is in its forward position depositing a sheet on the table 11 and peg rail 26. Upward movement of the plunger 157 with respect to the transfer member 16 causes the arm 152 of the bell crank 151 to engage the end 153 of the shifter bar 138 and move it to the left as viewed in Figure 5. A laterally extending boss 160 is provided on the shifter bar 138 and is engaged by the head 161 of a sliding plunger 162. A spring 163 encircling a portion of the plunger 162 applies a force to the plunger tending to move it toward the right as viewed in Figure 5 and thereby move the shifter bar 138 to the neutral position shown. The plunger 162 is provided with a stop collar 164 on its outer end which engages the stationary abutment 165 to limit movement of the plunger under the force of the spring 163. The function of the plunger 162 and spring 163 is to return the shifter bar 138 to its neutral position as soon as the transfer member 16 moves way from its sheet-depositing position. It will be observed that the shifter bar 138 remains in its forward position until moved rearwardly by the bell crank 151, but it remains in its rearward position only so long as the arm 152 of the bell crank 151 maintains it in such rearward position. As soon as the arm 152 moves away from the end 153 of the shifter bar 138 the spring 163 and plunger 162 acting on the boss 160 return the shifter bar 138 to its neutral position. The air pressure which serves to release the sheet 21 from the suction cups 95 is thus applied only for a short time interval, whereas the suction pressure from the vacuum line 123 acts through the suction cups 95 to hold the sheet 21 for a longer interval of time, that is, from the instant of pickup until its deposit on the table 11 and peg rail 26.

The glue-depositing mechanism generally designated 20 includes a guide block 166 fixed to the transfer member 16. The guide block is provided with a series of apertures 167 for sliding reception of one or more pencil-like vertical applicator rods 168. Each of the rods has a lower portion 169 of reduced diameter which slides through one of the series of small apertures 170 provided in the plate 171. The plate 171 is carried on the lower end of plunger 172 which is slidably mounted within the block 166. The plunger 172 is connected by means of adjustable threaded connections 173 to the armature 174 of an electrically operated solenoid mounted within the casing 175. When the solenoid is actuated to raise the armature 174 the plate 171 is raised and engages the shoulders 176 on the applicator rods 168, thereby raising them away from the plate 82. The lower ends of the rods 168 normally contact the upper surface 81$^a$ of the plate 82 when the transfer member 16 is in its rearward position. Since the upper surface 81$^a$ of the plate 82 is covered with glue or other adhesive a portion of this glue is picked up on the lower ends of the applicator rods 168. When the transfer member 16 is in its forward position depositing a sheet 21 on the table 11 the applicator rods 168 engage the top sheet in the pile 22 and thus deposit small spots of glue. The pattern of glue spots may be changed as desired by changing the number or location of the applicator rods in the apertures 167. The gluing operation may be interrupted when desired by energizing the solenoid within the casing 175, thereby raising the armature 174 and plate 171 and thereby lifting the rods 168 so that they do not contact the upper surface 81$^a$ of the glue plate 82.

Since it is desirable to have the same number of sheets 21 in each of the unit strips 24, means are provided for interrupting the gluing operation at predetermined intervals. As shown in Figure 2 this means may include a ratchet wheel 177 engaged by pawls 178 and 179. The pawl 179 is carried on pivoted arm 180 connected for actuation by link assembly 181. The link assembly 181 is pivotally connected to the support 68 at 182 so that vertical reciprocation of the support is communicated to the ratchet wheel 177. When the support 68 has moved through its vertical stroke for a predetermined number of times, for example, twenty-five times, the ratchet wheel 177 causes an electric switch (not shown) within the housing 183 to energize an electrical circuit through the solenoid contained within the casing 175. A manual cutout switch 184 may be mounted in the circuit if desired to prevent operation of the solenoid.

The peg rail 26 having the upstanding pegs or pins 25 is detachably connected to the carrier 66 so that it may be readily installed and replaced. With this arrangement peg rails having different pin spacings or different shaped pins may be quickly changed or substituted. As shown in Figure 11, the forward end 185 of the peg rail 26 may engage under the head of a screw 186 carried on the carrier 66. The other end 187 of the peg rail 26 is engaged by a clamp element 188 pivoted to the carrier 66 at 189. A spring 190 serves to hold the clamp arm 188 in operative position. To release the peg rail 26 the clamp element 188 is moved manually against the action of the spring 190 to release the end 187 of the peg rail. The later may then be tilted about its end 185 and withdrawn in an obvious manner.

The horizontal travel of the carrier 66 must be equal to the spacing of the pins 25 or some multiple thereof. Accordingly, the horizontal stroke of the carrier 66 must be changed whenever a peg rail of different pin spacing is to be employed. This change in stroke is accomplished by shifting the position of the roller 62 with respect to the arm 61 of the bell crank 58. As shown in Figure 3, the roller 62 may be carried in one of several openings 191 provided along the length of the arm 61. The maximum stroke is achieved with the roller 62 in position shown near the outer end of the arm while strokes of shorter length are accomplished by moving the roller 62 to one of the other locations 191. When the location of the roller 62 is changed to accommodate a peg rail having different pin spacing the presser foot assembly 100 is also changed to provide spacing of the slots 101 which are the same as the spacing of the pins 26.

The stack 22 of sheets 21 is supported on a plate 192 fixed to the upper ends of a pair of vertical bars 193. Rack teeth 194 provided on each bar 193 are engaged by the teeth of a pinion gear 195 fixed on a shaft 196. A ratchet wheel 197 is also fixed on the shaft 196 and is engaged by pawls 198 and 199. The pawl 199 is carried on an arm 200 pivoted on the shaft 196. A solenoid 201 is provided with an armature 202 which acts on the arm 200. This construction is such that whenever the solenoid 201 is energized the armature 202 is moved downward to cause counterclockwise movement of the arm 200 as shown in Figure 2. The pawl 199 moves the ratchet wheel 197, and this causes the pinion gear 195 to move the rack and bar 193 upward. The solenoid 201 is electrically connected to the microswitch 203 (Figure 6), and this switch is arranged to be closed by contact between the lower end of the screw 204 and the switch button 205. The screw 204 is threaded into the footpiece 206 and secured by means of the lock nut 207. The footpiece 206 is mounted by means of rods 208 and springs 209 on the transfer member 16. The abutment 210 on the footpiece engages the top sheet 21 on the pile 22. As the sheets 21 are transferred to the table 11 and pins 25 by means of the transfer member 16 and suction cups 95 the height of the pile 22 diminshes. When the upper level of the pile has dropped for a distance corresponding to the thickness of a number of sheets 21 the screw 204 actuates the microswitch 203. This serves to energize the solenoid 201 and causes the vertical bar 193 to be raised one notch to bring the top of the pile back to its initial level.

A guard or shield 211 may be provided on the surface of the table 11 if desired to cover the major portion of the link of the peg rails 26. As shown in Figures 1 and 10, the shield 211 may be clamped to the table 11 by means of suitable threaded fastenings 212. Spacers 213 position the shield 211 at the proper elevation to clear the pins 25 on the peg rails 26. The shield 211 may be provided with a ridge 214 for clearance over the pins 25. A forward edge 215 may be bent upward to avoid interference with the sheets in the shingled strip as it is advanced along the table 11. Power driven belts 216 may be provided on the table 11 for the purpose of removing the completed unit strips 24. These belts may pass over pulleys 217.

A peg rail similar to peg rail 26 may be mounted on the carrier 66 in position so that the pins 25 project upward through the slot 218 (Figure 1) in the table 11. In such event the peg rail 26 adjacent slot 26a is not used. The sheets 21a are positioned in the stack with their apertures at the right-hand end and in alignment with the slot 218. Adhesive material is applied adjacent the apertures, as before. The operation of the machine is identical to that described above except that a shingled strip 24a of the type shown in Figure 22 is produced. The sheets 21 and 21a may constitute partially printed forms, for example, check blanks, and are ordinarily printed on one side and provided with a carbon strip 21c on the other. When the peg rail 26 is aligned with the slot 218 the shingled strip 24a which is produced has its apertures on the right side and carbon strips 21c at the top of each sheet on the underside. In this form of shingled strip 24a, when turned to position to bring the printing upright, the lower edge of each individual sheet projects beyond the next adjacent sheet, whereas in the form of shingled strip 24 described first above the upper edge of each sheet projects beyond the adjacent sheet.

In the preferred embodiment of our invention shown in the drawings the machine is provided with duplicate parts acting side by side so that two shingled strips may be produced simultaneously in order to increase the rate of production. The shingled strips produced may be the type 24 shown in Figure 21 or the type 24a shown in Figure 22, or if desired one of each type may be produced simultaneously. The machine is symmetrical about a vertical plane passing through line 5—5 as shown in Figure 1. To avoid repetition the description and operation of the duplicate parts has been omitted since they are the same as that previously described.

The method of our invention may be carried out by other apparatus and is not limited to the use of the particular structure illustrated and described. The method may be performed by hand by using a transfer member having a sheet-gripping device and a glue-depositing mechanism spaced in the direction of intended movement of the member. Such member could be supported and moved by hand from a first position in which the sheet-gripping device rested on top of a pile of sheets and the glue mechanism rested in a glue chamber to a second position in which the sheet-gripping device rested on a table and the glue mechanism contacted the top sheet in the pile. The unit strip thus formed would be advanced intermittently by hand in coordination with movement of the transfer member.

Having fully described our invention, it is to be understood that we do not wish to be limited to the details herein set forth, but our invention is of the full scope of the appended claims.

We claim:

1. The method of forming a shingled strip from a stack of sheets, comprising the steps of: gripping the top sheet in the stack from the upper surface thereof, moving the sheet laterally away from the stack, depositing the sheet in staggered overlapping relationship with respect to a second sheet previously deposited and to which adhesive material has previously been applied, simultaneously applying adhesive material to the upper surface of the next sheet on the top of the stack, releasing the first said sheet, advancing the first and second said sheets as a unit in the direction of the said lateral movement, and repeating the steps to increase the number of sheets in the shingled strip.

2. The method of forming a shingled strip from a stack of sheets, comprising the steps of: gripping the top sheet in the stack, raising the sheet from the stack, moving the sheet laterally away from the stack, lowering the sheet to deposit it in staggered overlapping relationship with respect to a second sheet previously deposited and to which adhesive material has previously been applied, simultaneously applying adhesive material to the upper surface of the next sheet on the top of the stack, releasing the first said sheet, advancing the first and second said sheets in the direction of the said lateral movement, and repeating the steps to increase the number of sheets in the shingled strip.

3. The method of forming a shingled strip from a stack of sheets each having a series of apertures along a side edge, comprising the steps of: gripping the top sheet in the stack from the upper surface thereof, moving the sheet laterally away from the stack, depositing the sheet upon a row of pins in staggered overlapping relationship with respect to a second sheet previously deposited and to which adhesive material has previously been applied, simultaneously applying adhesive material to the upper surface of the next sheet on the top of the stack, releasing the first said sheet, moving the row of pins to advance the first and second said sheets in the direction of the lateral movement, and repeating the steps to increase the number of apertured sheets in the shingled strip.

4. The method of forming a shingled strip from a stack of sheets by means of a transfer member having a sheet gripper and an adhesive applicator thereon, comprising the steps of: resting the member in a first position with the sheet gripper in contact with the top sheet in the stack, moving the member laterally to transport the said sheet to a second position to deposit said sheet in staggered overlapping relationship with respect to a second sheet previously deposited and to which sheet adhesive material has previously been applied, simultaneously contacting the adhesive applicator with the next sheet on the top of the stack, releasing the first said sheet from the sheet gripper, returning the transfer member to said first position, advancing the first and second said sheets as a unit in the direction of movement of said member, and repeating the above steps to increase the number of sheets in the shingled strip.

5. The method of forming a shingled strip from a stack of sheets by means of a transfer member having a sheet gripper and an adhesive applicator thereon, comprising the steps of: resting the member in a first position with the sheet gripper in contact with the top sheet in the stack, raising the member to lift said sheet from the stack, moving the member laterally to transport the said sheet, lowering the member to a second position to deposit said sheet in staggered overlapping relationship with respect to a second sheet previously deposited and to which sheet adhesive material has previously been applied, simultaneously contacting the adhesive applicator with the next sheet on the top of the stack, releasing the first said sheet from the sheet gripper, returning the transfer member to said first position, advancing the first and second said sheets in the direction of movement of said member, and repeating the above steps to increase the number of sheets in the shingled strip.

6. The method of employing a transfer member having a sheet gripper and an adhesive applicator thereon for the purpose of forming a shingled strip from a stack of sheets each having a row of apertures along a side edge, comprising the steps of: resting the member in a first position with the sheet gripper in contact with the top sheet in the stack, moving the member laterally to transport the said sheet to a second position to deposit said sheet upon a row of pins in staggered overlapping relationship with respect to a second sheet previously deposited and to which sheet adhesive material has previously been applied, simultaneously contacting the adhesive applicator with the next sheet on the top of the stack, releasing the first said sheet from the sheet gripper, returning the transfer member to said first position, moving the row of pins to advance the first and second said sheets as a unit in the direction of movement of said member, and repeating the above steps to increase the number of apertured sheets in the shingled strip.

7. In a device for forming a shingled strip from a stack of sheets, the combination of: a table, a transfer member, a sheet-gripping device on the transfer member, an adhesive applicator on the transfer member spaced from the sheet-gripping device, means for moving the transfer member from a first position in which the sheet-gripping device rests on the top sheet in the stack to a second position in which the adhesive applicator rests on the next sheet on the top of the stack, the sheet-gripping device in said second position serving to deposit the first said sheet on the table, and means acting in timed relation with the movement of the transfer member for advancing by increments the sheets deposited on the table.

8. In a device for forming a shingled strip from a stack of sheets each having a series of apertures along a side edge, the combination of: a table, an element movably mounted with respect to the table and provided with a row of upstanding pins, a transfer member, a sheet-gripping device on the transfer member, an adhesive applicator on the transfer member spaced from the sheet-gripping device, means for moving the transfer member from a first position in which the sheet-gripping device rests on the top sheet in the stack to a second position in which the adhesive applicator rests on the next sheet on the top of the stack, the sheet-gripping device in said second position serving to deposit the first said sheet on the table with certain of the pins passing through the apertures in the sheet.

9. In a device for forming a shingled strip from a stack of sheets each having a series of apertures along a side edge, the combination of: a table, an element movably mounted with respect to the table and provided with a row of upstanding pins, a transfer member, a sheet-gripping device on the transfer member, an adhesive applicator on the transfer member spaced from the sheet-gripping device, means for moving the transfer member from a first position in which the sheet-gripping device rests on the top sheet in the stack to a second position in which the adhesive applicator rests on the next sheet on the top of the stack, the sheet-gripping device in said second position serving to deposit the first said sheet on the table with certain of the pins passing through the apertures in the sheet, and means acting in timed relation with the movement of the transfer member for moving said element to advance by increments the sheets deposited on the table.

10. In a device for forming a shingled strip from a stack of sheets, each of the sheets having a row of apertures along one edge, the combination of: a frame having a table surface, an element movably mounted on the frame and provided with a row of upstanding pins, a transfer member having a sheet-gripping device, means on the frame supporting the transfer member for movement between a first position in which the sheet-gripping device rests on the top sheet in the stack to a second position in which the sheet is deposited on the table surface with certain of the upstanding pins extending through the apertures in the sheet, means acting in timed relationship for moving the said element forward to advance the sheet by increments and for moving the transfer member back and forth between said first and second positions.

11. In a device for forming a shingled strip from a stack of sheets, each of the sheets having a row of apertures along one edge, the combination of: a frame having a table, a peg rail provided with a row of upstanding pins, a support member movably mounted upon the frame and supporting the peg rail, a transfer member having a sheet-gripping device, means on the frame supporting the transfer member for movement between a first position in which the sheet-gripping device rests on the top sheet in the stack to a second position in which the sheet is deposited on the table with certain of the upstanding pins extending through the apertures in the sheet, means for moving the transfer member back and forth between said first and second positions, means acting in timed relationship therewith for moving the support member both laterally and vertically in a continuous path, said movement of the support member serving to advance the pins, retract them downward out of the sheet apertures, return them laterally and project them upward into said apertures in a new location.

12. In a device for forming a shingled strip from a stack of sheets, each of the sheets having a row of apertures along one edge, the combination of: a frame having a table, an element movably mounted upon the frame and provided with a row of upstanding pins, means on the frame for transferring a sheet from the top of the stack and depositing it on the table with certain of the upstanding pins extending through the apertures in the sheet, means acting in timed relationship with the transfer means for moving the element both laterally and vertically in a cycle to advance the pins laterally, retract them downward out of the sheet apertures, return them laterally and project them upward into said apertures in a new location.

13. In a device for forming a shingled strip from a stack of sheets, each of the sheets having a row of apertures along one edge, the combination of: a frame having a table, a member mounted for vertical movement on said frame, a carrier mounted for horizontal movement on said member, an element on the carrier provided with a row of upstanding pins, means on the frame for transferring a sheet from the top of the stack and depositing it on the table with certain of the upstanding pins extending through the apertures in the sheet, means acting in timed relationship with the transfer means for moving said member and carrier to move the element both laterally and vertically in a continuous path, whereby the pins enter and leave the sheet apertures and advance the sheet in an intermittent motion.

14. In a device for forming a shingled strip from a stack of sheets, each of the sheets having a row of apertures along one edge, the combination of: a frame having a table, a member mounted for vertical movement on said frame, a carrier mounted for horizontal movement on said member, an element on the carrier provided with a row of upstanding pins, means on the frame for transferring a sheet from the top of the stack and depositing it on the table with certain of the upstanding pins extending through the apertures in the sheet, means acting in timed relationship with the transfer means for moving the said member and carrier in a cycle to advance the pins laterally, retract them downward out of the sheet apertures, return them laterally and project them upward into said apertures in a new location.

15. A device for forming a shingled strip from a stack of sheets, comprising in combination: a frame having a table surface, a pair of laterally spaced vertical posts guided for vertical movement relative to the frame, a crosshead carried on said posts and provided with parallel horizontal guide bars, a transfer member mounted for sliding movement on said bars, a sheet-gripping device and an adhesive applicator mounted on the transfer member and spaced in the direction of movement of said member, means for raising the posts and shifting the transfer member in timed relationship to move the transfer member from a first position in which the sheet-gripping device rests on the top sheet in the stack to a second position in which the adhesive applicator rests on the next sheet on the top of the stack, the sheet-gripping device in said second position serving to deposit the first said sheet on said table surface in staggered overlapping relationship with respect to a second sheet previously deposited, means for releasing the first said sheet from the sheet-gripping device, and means acting in timed relationship with respect to vertical movement of the posts and shifting of the transfer member for advancing the said first and second sheets by increments in the direction of movement of said transfer member.

16. A device for forming a shingled strip from a stack of sheets, each of the sheets having a row of apertures along one edge, comprising in combination: a frame, an element movably mounted upon the frame and provided with a row of upstanding pins, a pair of laterally spaced vertical posts guided for vertical movement relative to the frame, a crosshead carried on said posts and provided with parallel horizontal guide bars, a transfer member mounted for sliding movement on said bars, a sheet-gripping device and an adhesive applicator mounted on the transfer member, means for raising the posts and shifting the transfer member to move the transfer member from a first position in which the sheet-gripping device rests on the top sheet in the stack to a second position in which the adhesive applicator rests on the next sheet on the top of the stack, the sheet-gripping device in said second position serving to deposit the first said sheet on said pins in staggered overlapping relationship with respect to a second sheet previously deposited, means for releasing the first said sheet from the sheet-gripping device, and means for moving the pin-carrying element for advancing the first and second said sheets by increments in the direction of movement of said transfer member.

17. In a device for forming a shingled strip from a stack of sheets each having a series of apertures along one edge, the combination of: a frame having a table, an adhesive supply device on the frame, an element movably mounted on the frame and provided with a row of upstanding pins, a transfer member movably mounted upon the frame, a sheet-gripping device and an adhesive applicator mounted on the transfer member in spaced relationship, the transfer member being movable between a first position in which the sheet-gripping device rests upon the top sheet in the pile and the adhesive applicator contacts the adhesive supply device, and a second position in which the sheet-gripping device deposits said sheet on the table in engagement with the pins and the adhesive applicator contacts the next sheet on top of the stack.

18. In a device for forming a shingled strip from a stack of sheets each having a series of apertures along one edge, the combination of: a frame having a table, an adhesive supply device on the frame, an element movably mounted on the frame and provided with a row of upstanding pins, a transfer member movably mounted upon the frame, a sheet-gripping device and an adhesive applicator mounted on the transfer member in spaced relationship, the transfer member being movable between a first position in which the sheet-gripping device rests upon the top sheet in the pile and the adhesive applicator contacts the adhesive supply device, and a second position in which the sheet-gripping device deposits said sheet on the table in engagement with the pins and the adhesive applicator contacts the next sheet on top of the stack, and means moving said element for intermittently advancing the sheets as a unit along the table.

19. In a device for forming a shingled strip from a stack of sheets, the combination of: a frame having a table, an adhesive supply device on the frame, a transfer member movably mounted upon the frame, a sheet-gripping device and an adhesive applicator mounted on the transfer member in spaced relationship, the transfer member being movable between a first position in which the sheet-gripping device rests upon the top sheet in the pile and the adhesive applicator contacts the adhesive supply device, and a second position in which the sheet-gripping device deposits said sheet on the table and the adhesive applicator contacts the next sheet on top of the stack, electrically operated means on the transfer member for raising the adhesive applicator to an inoperative position, a counter operatively connected to the device to count the number of sheets in the shingled strip, and a switch operated by said counter for energizing said electrically operated means.

20. In a device for forming a shingled strip from a stack of sheets, each of the sheets having a row of apertures along one edge, the combination of: a frame having a table provided with parallel slots, a carrier movably mounted upon the frame, an element provided with a row of upstanding pins, means for securing the element to the carrier in either of two positions so that the pins may project upward through either of said slots, means on the frame for transferring a sheet from the top of the stack and depositing it on the table between the slots with certain of the upstanding pins extending through the apertures in the sheet, and means acting in timed relationship with the transfer means for moving the carrier both laterally and vertically in a cycle to advance the pins laterally, retract them downward out of the sheet apertures, return them laterally and project them upward into said apertures in a new location.

21. A device for forming a shingled strip from a stack of sheets, comprising in combination: a frame having a table surface, a transfer member mounted for movement relative to the frame, a sheet-gripping device mounted on the transfer member, means for moving the transfer member from a first position in which the sheet-gripping device rests on the top sheet in the stack to a second position in which the sheet-gripping device deposits the sheet on said table surface, means cooperating with the transfer member whereby the sheet is deposited in staggered overlapping relationship with respect to a sheet previously deposited, the sheet-gripping device including at least one suction cup adapted to contact the top surface of each sheet in turn, a valve assembly on the transfer member operatively connected to the suction cup, a suction line and a pressure line communicating with the valve assembly, a valve actuator movably mounted upon the transfer member, cooperating parts on the frame and transfer member operative in said first position to shift the actuator in a direction to connect the suction cup with the suction line, and operative in said second position to connect the suction cup with the pressure line.

References Cited in the file of this patent
UNITED STATES PATENTS

| | | |
|---|---|---|
| 1,418,145 | Fischer | May 30, 1922 |
| 1,440,856 | Westcott | Jan. 2, 1923 |
| 2,266,171 | Davis | Dec. 16, 1941 |
| 2,295,055 | Rupp | Sept. 8, 1942 |
| 2,295,073 | Blythe | Sept. 8, 1942 |
| 2,371,179 | Mendes | Mar. 13, 1945 |
| 2,476,250 | Paulsen | July 12, 1949 |
| 2,627,809 | Worth | Feb. 10, 1953 |